(12) United States Patent
Williams et al.

(10) Patent No.: US 12,454,916 B2
(45) Date of Patent: Oct. 28, 2025

(54) MULTI-COMPONENT SWIRL VALVES

(71) Applicant: Collins Engine Nozzles, Inc., Des Moines, IA (US)

(72) Inventors: Brandon P. Williams, Johnston, IA (US); Jason A. Ryon, Carlisle, IA (US); Philip E. O. Buelow, West Des Moines, IA (US); Andy W. Tibbs, Earlham, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/539,824

(22) Filed: Dec. 14, 2023

(65) Prior Publication Data

US 2025/0198344 A1     Jun. 19, 2025

(51) Int. Cl.
| | |
|---|---|
| *F02C 7/232* | (2006.01) |
| *B05B 1/34* | (2006.01) |
| *F02M 61/16* | (2006.01) |
| *F16H 1/28* | (2006.01) |
| *F16K 31/53* | (2006.01) |

(52) U.S. Cl.
CPC ............. *F02C 7/232* (2013.01); *B05B 1/341* (2013.01); *F02M 61/162* (2013.01); *F16H 1/28* (2013.01); *F16K 31/535* (2013.01)

(58) Field of Classification Search
CPC .. F02C 7/222; F02C 7/232; F02C 9/26; B05B 1/12; B05B 1/1636; B05B 1/1645; B05B 1/1654; B05B 1/3415; B05B 1/3426; B05B 1/3421; F02M 61/162; F02M 61/163; F23R 3/28; F23R 3/286; F23R 3/38; F16K 31/53; F16K 31/535; F16H 1/28

See application file for complete search history.

(56) References Cited

U.S. PATENT DOCUMENTS

| | | | | |
|---|---|---|---|---|
| 3,746,257 | A * | 7/1973 | Broad | F23D 11/345 |
| | | | | 431/2 |
| 3,958,413 | A * | 5/1976 | Cornelius | F23R 3/14 |
| | | | | 60/39.23 |
| 4,360,161 | A * | 11/1982 | Claxton | F02M 51/0671 |
| | | | | 239/585.4 |
| 4,575,603 | A * | 3/1986 | Inoue | B23H 7/101 |
| | | | | 204/206 |
| 4,809,512 | A | 3/1989 | Barbier et al. | |
| 6,695,229 | B1 | 2/2004 | Heinbuch et al. | |
| 6,857,585 | B2 * | 2/2005 | Winner | F02M 61/18 |
| | | | | 239/125 |

(Continued)

OTHER PUBLICATIONS

Extended European Search Report for European Patent Application No. 24216296.4, dated Apr. 25, 2025, 7 pages.

*Primary Examiner* — Alain Chau
(74) *Attorney, Agent, or Firm* — Kinney & Lange, P.A.

(57) ABSTRACT

A valve system includes at least one spin chamber having an outlet drain configured to allow flow out of the spin chamber. A main spin surface of the at least one spin chamber is defined around the outlet drain. A directional jet system is in fluid communication with the at least one spin chamber. The directional jet system includes a plurality of members each is configured to move between a first position for directing a tangential flow around the drain of the at least one spin chamber and a second position for directing a radial flow toward the drain of the at least one spin chamber.

20 Claims, 11 Drawing Sheets

(56) References Cited

U.S. PATENT DOCUMENTS

| | | | |
|---|---|---|---|
| 6,929,195 B2 * | 8/2005 | Park | F02M 51/061 |
| | | | 239/585.5 |
| 9,067,222 B2 * | 6/2015 | Gransow | B05B 15/652 |
| 10,302,211 B2 | 5/2019 | Ohashi | |
| 10,927,803 B2 | 2/2021 | Saito et al. | |
| 10,974,259 B2 * | 4/2021 | Rong | B05B 1/18 |
| 11,053,862 B2 | 7/2021 | Ryon et al. | |
| 11,168,887 B2 * | 11/2021 | Stankowski | F23R 3/283 |
| 11,326,775 B2 | 5/2022 | Kramer | |
| 11,365,884 B2 | 6/2022 | Proscia | |
| 11,590,518 B2 * | 2/2023 | Rong | B05B 1/1636 |
| 11,833,295 B2 * | 12/2023 | Greiner-Perth | A61M 15/08 |
| 11,845,091 B2 * | 12/2023 | Rong | B05B 1/1663 |
| 12,292,197 B2 * | 5/2025 | Knapton | F23R 3/346 |
| 2003/0075619 A1 * | 4/2003 | Park | F02M 61/162 |
| | | | 239/585.1 |
| 2003/0155439 A1 * | 8/2003 | Winner | F02M 61/18 |
| | | | 239/584 |
| 2003/0173424 A1 * | 9/2003 | Dentes | F02M 61/1806 |
| | | | 239/533.2 |
| 2012/0152202 A1 | 6/2012 | Kurokawa | |
| 2014/0008462 A1 * | 1/2014 | Gransow | B05B 1/14 |
| | | | 239/391 |
| 2019/0283048 A1 * | 9/2019 | Rong | B05B 1/12 |
| 2019/0376690 A1 * | 12/2019 | Niemeyer | F23R 3/286 |
| 2020/0171252 A1 * | 6/2020 | Greiner-Perth | B05B 1/3452 |
| 2021/0095851 A1 * | 4/2021 | Stankowski | F23R 3/28 |
| 2023/0358405 A1 * | 11/2023 | Knapton | F23D 11/383 |

\* cited by examiner

MULTI-COMPONENT SWIRL VALVES

BACKGROUND

1. Field

The present disclosure relates to flow control, and more particularly to flow control such as for controlling flow of fuel in aircraft fuel injection and the like.

2. Description of Related Art

Certain valves require only adjustment of the flow over a given range and not complete control, e.g. they do not have to completely close off flow. Some valves have springs with a balanced pressure force to control the open area of the valve. Some valves have integral check valves. Certain valves can be electronically controlled through a solenoid, stepper motor, or the like.

Spool valves are currently used in fuel injectors for gas turbine engines to control the flow to a circuit for a given inlet pressure. They can be costly to make because of multiple factors such as the following. They are often made using a carefully toleranced port opening to allow a certain amount of flow for a given pressure. The spool valve is typically match ground with the sleeve to reduce the amount of leakage which bypasses the metering port. On the other hand, electronic solenoid type valves typically need large power forces to overcome flow pressure to adjust the spool window.

The conventional techniques have been considered satisfactory for their intended purpose. However, there is an ever present need for improved systems and methods for reliable and cost effective valving, such as for valves used in fuel injectors for gas turbine engines and the like. This disclosure provides a solution for this need.

SUMMARY

A valve system includes at least one spin chamber having an outlet drain configured to allow flow out of the spin chamber. A main spin surface of the at least one spin chamber is defined around the outlet drain. A directional jet system is in fluid communication with the at least one spin chamber. The directional jet system includes a plurality of members each is configured to move between a first position for directing a tangential flow around the drain of the at least one spin chamber and a second position for directing a radial flow toward the drain of the at least one spin chamber.

A single actuator can be operatively connected to actuate each of the members in the plurality of members together. The actuator can include a rotary prime mover engaged to rotate a sun gear, wherein each member in the plurality of members can be engaged to a respective planet gear that meshes with the sun gear for rotation of all of the members of the plurality of members between the first and second positions by action of the rotary prime mover. A carrier can be operatively connected to all of the respective planet gears to maintain a respective fixed axis relative to a valve housing for each of the members of the plurality of members for rotation between the first and second positions. A ring gear can be meshed to all of the respective planet gears and configured to maintain a respective fixed axis relative to a valve housing for each of the members of the plurality of members for rotation between the first and second positions. Each respective planet gear can have its own gear ratio to the sun gear unique among the respective planet gears so each member of the plurality of members has a different rate of response relative to one another to motion of the rotary prime mover.

The rotary prime mover can be inside the housing. The rotatory prime mover actuator can be outside of the housing with a shaft extending into housing operatively connected to rotate the directional jet system. The rotary prime mover can be operatively connected to rotate the direction jet system between the first position and the second position around a rotation axis parallel to an axis defined by the outlet drain. The directional jet system can include a check valve operatively connected to the spin chamber to check the jet orifice in a third position of the directional jet system to stop flow into the spin chamber from the directional jet system below a predetermined pressure. The main spin surface can be planar. The main spin surface can be conical, converging towards the drain outlet. The at least one spin chamber can include a plurality of spin chambers, each including its own respective drain, wherein each of the members in the plurality of members is in fluid communication with a respective one of the spin chambers in the plurality of spin chambers to feed into the respective drain.

The at least one spin chamber can be a single spin chamber into which all of the members of the plurality of members feed into the drain of the single spin chamber. A single inlet can be in fluid communication with a valve housing that houses the plurality of members. Each member of the plurality of members can be a directional vane, wherein one flow path is defined from the single inlet, through the directional vanes, and into the drain.

Each member in the plurality of members can include a jet tube defined through a respective rotational body. Each member in the plurality of members can have a different starting position from the other members in the plurality of members relative to the housing.

The housing can include a main inlet in fluid communication with a first chamber. The at least one spin chamber can be a single spin chamber in the housing. Each of the members in the plurality of members can include an inlet in the first chamber and a direction outlet jet in the single spin chamber. The drain outlet can be in fluid communication with a hydromechanical piston valve assembly. The housing can include a third chamber in fluid communication with the first chamber through a respective schedule port window defined in each member of the plurality of members.

A feed arm can be connected in fluid communication with the drain outlet. A spray nozzle can be connected in fluid communication with the feed arm downstream of the drain outlet for issuing a spray.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
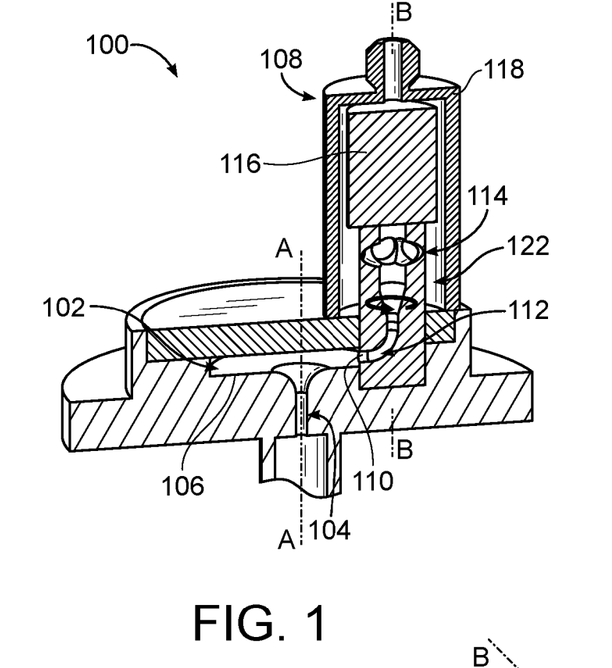
FIG. 1 is a schematic cross-sectional perspective view of an embodiment of a valve system constructed in accordance with the present disclosure, showing the directional jet system and the spin chamber.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-22, as will be described. The systems and methods described herein can be used to control flow through a valve system using a directional jet and spin chamber, wherein changing direction of the jet relative to the spin chamber allows for increasing or decreasing flow through the valve system.

Reference will now be made to the drawings wherein like reference numerals identify similar structural features or aspects of the subject disclosure. For purposes of explanation and illustration, and not limitation, a partial view of an embodiment of a valve system in accordance with the disclosure is shown in FIG. 1 and is designated generally by reference character 100. Other embodiments of systems in accordance with the disclosure, or aspects thereof, are provided in FIGS. 2-11, as will be described. The systems and methods described herein can be used to control flow through a valve system using a directional jet and spin chamber, wherein changing direction of the jet relative to the spin chamber allows for increasing or decreasing flow through the valve system.

The valve system 100 includes a spin chamber 102 having an outlet drain 104 configured to allow flow out of the spin chamber 102. A main spin surface 106 of the spin chamber is defined around the outlet drain 104, i.e. around an axis A defined through the outlet drain 104. A directional jet system 108 is in fluid communication with the spin chamber 102. The directional jet system 108 includes a member that is configured to move between a first position for directing a tangential flow around the drain, e.g. as indicated by the flow arrow in FIG. 6, and a second position for directing a radial flow toward the drain, as indicated by the flow arrow in FIG. 7. Directing the flow in the tangential direction indicated in FIG. 6 reduces flow through the valve system 100 relative to directing flow in the radial direction of FIGS. 1 and 7, so rotation of the directional jet ultimately controls how much flow can go through the valve system 100. Intermediate positions between the tangential and radial positions allow for intermediate flow volumes.

With continued reference to FIG. 1, the directional jet system 108 includes a jet orifice 110 that feeds into the spin chamber 102. The spin chamber 102 need only include one inlet, namely the jet orifice 110, and one outlet, namely the outlet drain 104. The jet member includes a jet tube 112. The jet orifice 110 is defined at an outlet end of the jet tube 112. The directional jet system 108 is configured to rotate the jet tube 112 about rotation axis B to direct the jet orifice 110 more toward a periphery of the spin chamber in the first position relative to the second position, for lower flow, highly swirling tangential flow in the spin chamber. The directional jet system 108 is configured to rotate the jet tube 112 about the rotation axis B to direct the jet orifice 110 more toward the drain outlet 104 in the second position relative to the first position for higher flow, relatively swirl free flow in the spin chamber. The directional jet system 108 includes one or more inlets, e.g. tangential inlets 114 configured to feed into the jet tube 112 to supply fluid to the jet orifice 110.

With continued reference to FIG. 1, the directional jet system 108 includes a rotational actuator 116 operatively connected to rotate the jet tube 112 back and forth between the first and second positions, i.e. about the rotation axis B. The actuator 116 can be a two way rotary solenoid or stepper motor, or the like, and/or can include a return bias member such as a spring so the actuator is biased toward one extreme position when not energized. Reference is made to to U.S. Pat. No. 9,617,919 (which is incorporated by reference herein in its entirety) for possible examples of low energy multi-position solenoids. Note that the position of the jet tube 112 can cover not only full-on/off operation but can be positioned proportionally anywhere between the positions of FIGS. 5 and 7 for example, and the rotary actuator can cover operation all the way from either a fixed position 1 to position 2, but also varying the position between two positions gradually. Stepper motors can be used which could have very fine increments (e.g. 5° control) which would give good proportionality.

The directional jet system 108 includes a housing 118 with a main inlet 120 in fluid communication with an interior 122 of the housing 118. The jet tube 112 includes at least one inlet 114 inside the housing 118 in fluid communication to receive flow from the interior 122 of the housing 118 into the jet tube 112. The rotational actuator 116 is inside the housing 118, and is operatively connected to rotate the jet tube 112 between the first and second positions around a rotation axis B that is parallel to the axis A defined by the drain outlet 104, and the main inlet 120 extends parallel with or along the axis B, and parallel with the axis A. The main spin surface is planar 106, however it is also contemplated that the main spin surface 106 can be conical, as shown in FIGS. 2-3, converging towards the drain outlet 104, e.g. to reduce flow angle into the drain outlet 104 and reduce pressure loss.

Figure 2:
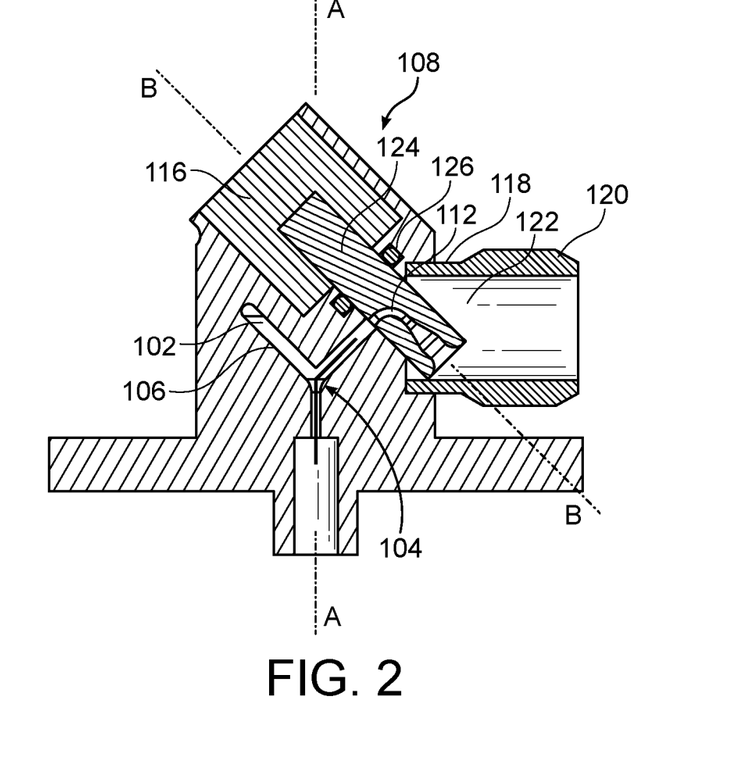
FIG. 2 is a cross-sectional side elevation view of an embodiment of the valve system of FIG. 1, showing a conical spin chamber.
Figure 3:
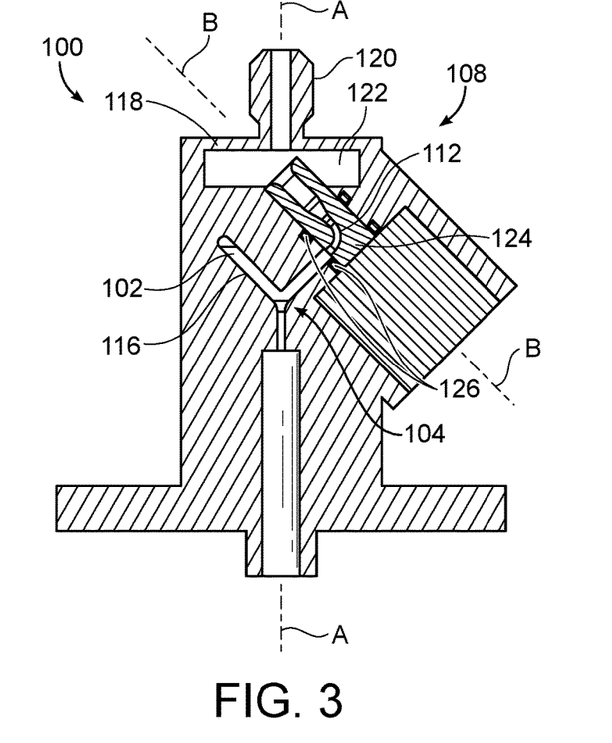
FIG. 3 is a cross-sectional side elevation view of an embodiment of the valve system of FIG. 2, showing a different packaging of valve actuator.

With continued reference to FIGS. 2-3, the rotation actuator 116 can be outside of the housing 118 with a shaft 124 extending into housing 118 operatively connected to rotate jet tube 112 inside housing. As shown in FIG. 2, the main inlet 120 can extend lateral to the axis A and to the axis B, wherein the rotational actuator 116 is operatively connected to rotate the jet tube 112 between the first and second positions around a rotation axis B that is oblique to the axis A. In FIG. 3, the main inlet 120 extends along or parallel to the axis A defined by the drain outlet 104, although the rotational actuator 116 is operatively connected to rotate the jet tube 112 between the first and second positions around a rotation axis B that is oblique to the axis A. Seals such as o-rings 126 can be used to prevent leaking round the porting for the jet tube 112.

Figure 4:
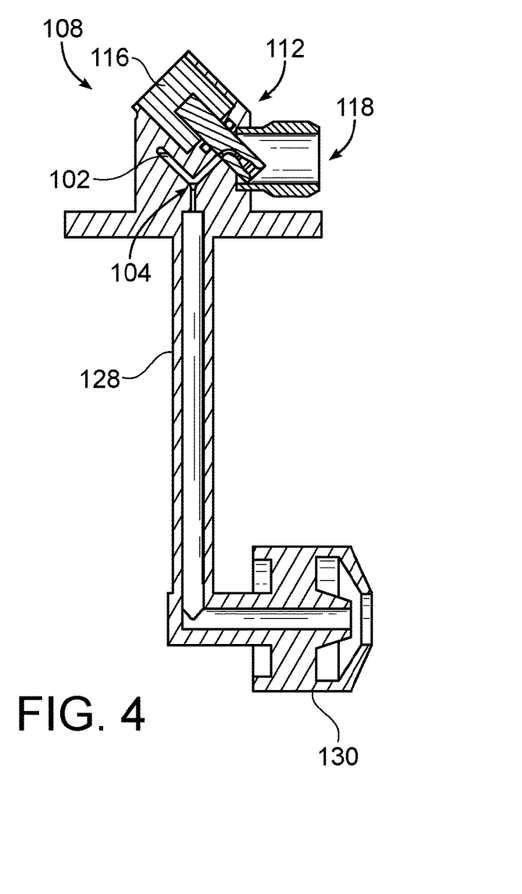
FIG. 4 is a cross-sectional side elevation view of the valve system of FIG. 2, showing the feed arm and spray nozzle.

With reference to FIG. 4, a feed arm 128 can be connected in fluid communication with the drain outlet 104. A spray nozzle 130 can be connected in fluid communication with the feed arm 128 downstream of the drain outlet 104 for issuing a spray, such as for fuel injection in a gas turbine engine or the like. The feed arm 128 and spray nozzle 130 are shown for the configuration of the valve system 100 as shown in FIG. 2, however those skilled in the art will readily appreciate that the feed arm 128 and spay nozzle 130 can be included in any of the configurations disclosed herein.

Figures 5, 6:
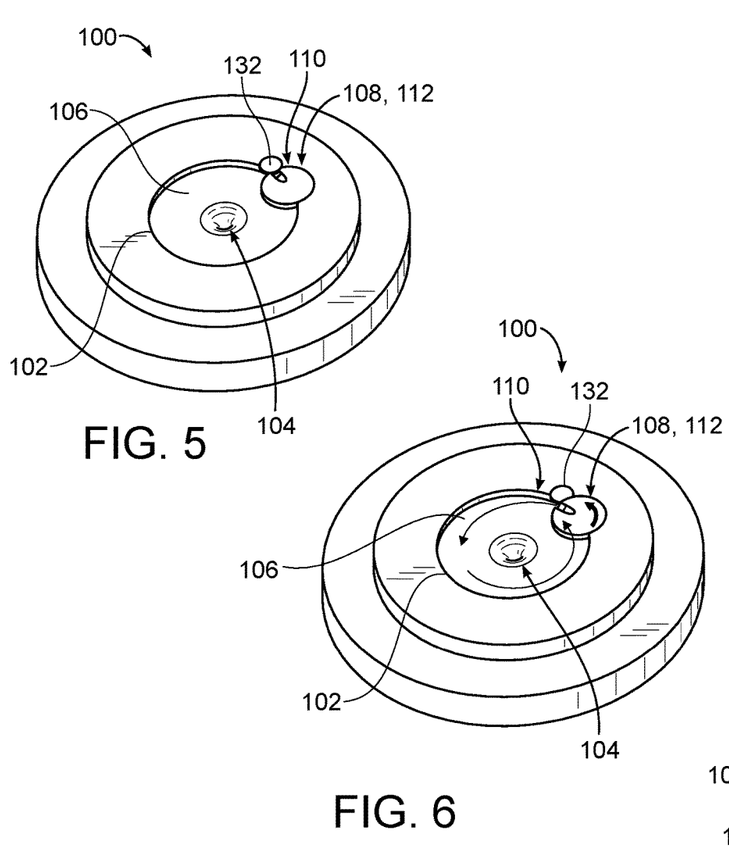
FIGS. 5-7 are schematic perspective views of an embodiment of the system of FIG. 1, showing three respective positions of the jet tube.
Figure 7:
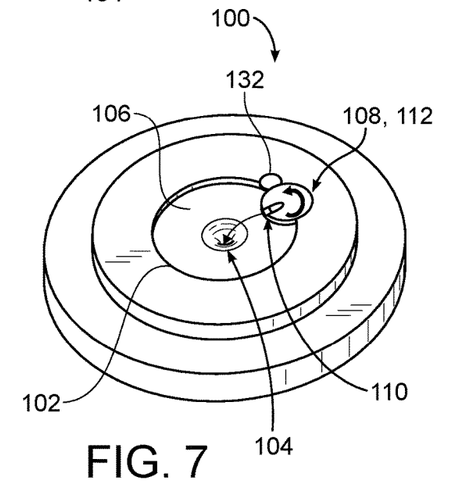

With reference now to FIGS. 5-7, the directional jet system 106 can include a seal 132 operatively connected to the spin chamber 102 to seal the jet orifice 110 in a third position of the directional jet system 108 to stop flow into the spin chamber 102 from the directional jet system 108, as shown in FIG. 5, where FIGS. 6-7 show the first and second positions described above, with corresponding tangential and radial flow arrows, respectively. In addition to or in lieu of a seal 132, the item 132 can be a check valve operatively connected to the spin chamber 102 to check the jet orifice 110 in the third position of the directional jet system 108 to stop flow into the spin chamber 102 from the directional jet system 108 below a predetermined inlet pressure. The check valve configuration may not require elastomeric seal. Incorporating a completely closed check valve when jet is rotated past spin chamber wall allows valve to open as a port window until the jet is fully exposed, then with continued rotation toward the radial direction, the system can behave like a swirl valve. It is also contemplated that the seal 132 can be omitted and the jet orifice 110 can simply seal against the wall of the spin chamber 102 in the third position shown in FIG. 5.

Figure 8:
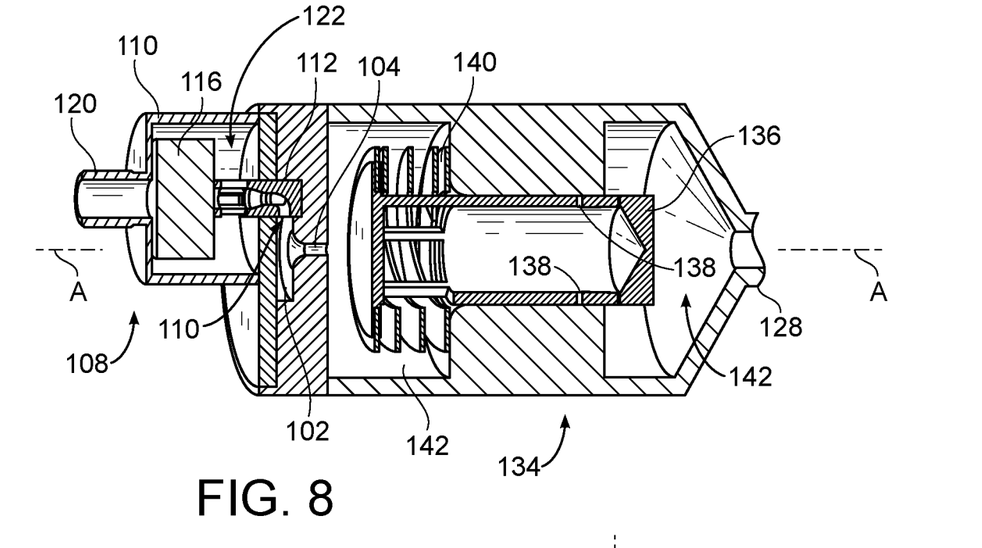
FIGS. 8-9 are cross-sectional schematic perspective views of embodiments of the system of FIG. 1, showing the directional jet system in series and in parallel with a hydromechanical valve assembly, respectively.
Figure 9:
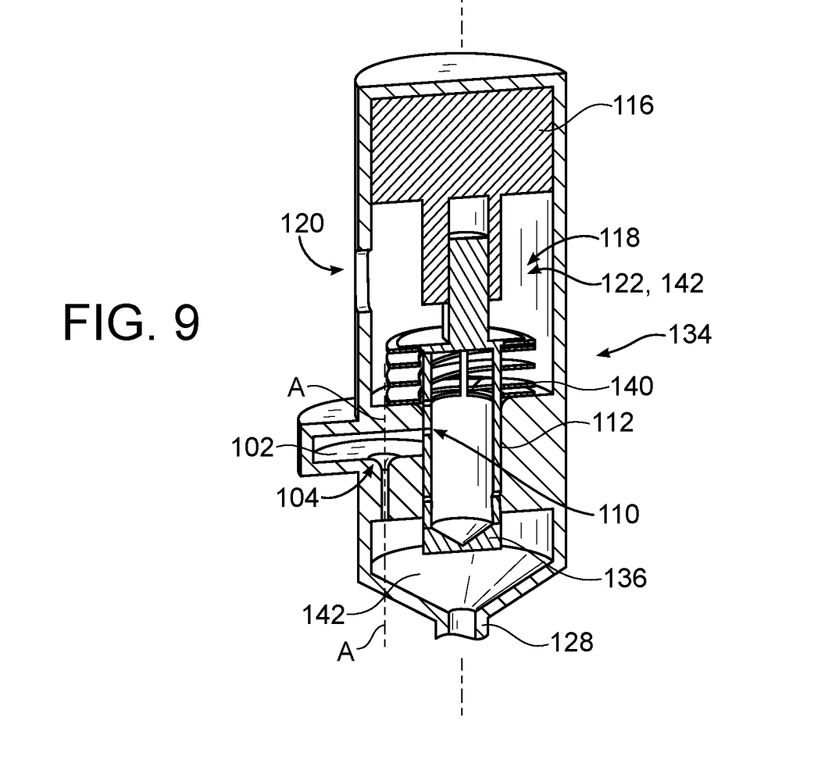

With referenced now to FIGS. 8-9, the drain outlet 104 can feed, i.e. direct flow, into a hydromechanical piston valve assembly 134 that includes a piston 136 with ports 138 and a biasing member 140 configured to bias the member against pressure flowing through the assembly 134. When pressure on flow through the assembly 134 acts on the piston 136, the piston 136 can slide linearly along its axis against the bias of the biasing member 140. In FIG. 8, the drain outlet 104 feeds into the hydromechanical piston valve assembly 134 in series with a main flow passage 142 through the hydromechanical piston valve assembly 134, e.g. upstream of the piston 136. In FIG. 9, the drain outlet 104 feeds into the hydromechanical piston valve assembly 134 in a side stream that is parallel with a main flow passage 142 through the hydromechanical piston valve assembly 134. In this case, the actuator 116 rotates the piston 136, which doubles as the jet tube 112. The rotational direction of the outlet orifice 110 controls how much flow can pass through the side stream that includes the drain outlet 104. The piston 136 is keyed to the shaft 124 of the actuator 116 for rotation by the actuator 116, but the piston 136 is free to slide along its axis relative to the shaft 124 of the actuator 116.

Figure 10:
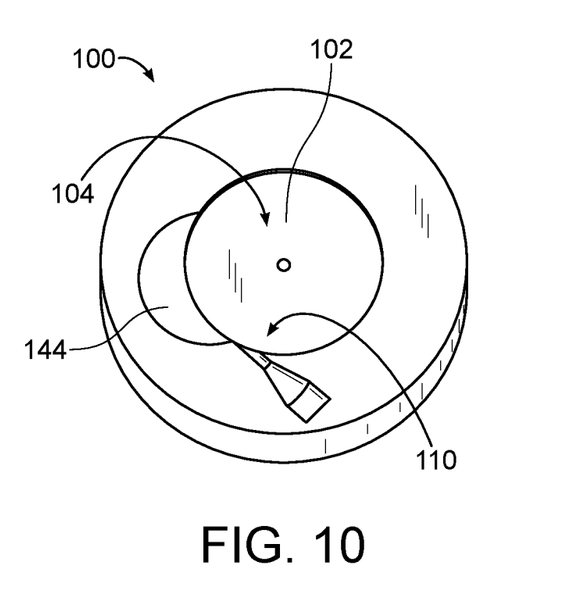
FIGS. 10-11 are schematic perspective views of an embodiment of the system of FIG. 1, showing a diverter for a fixed jet orifice, showing the diverter in the first and second positions, respectively.
Figure 11:
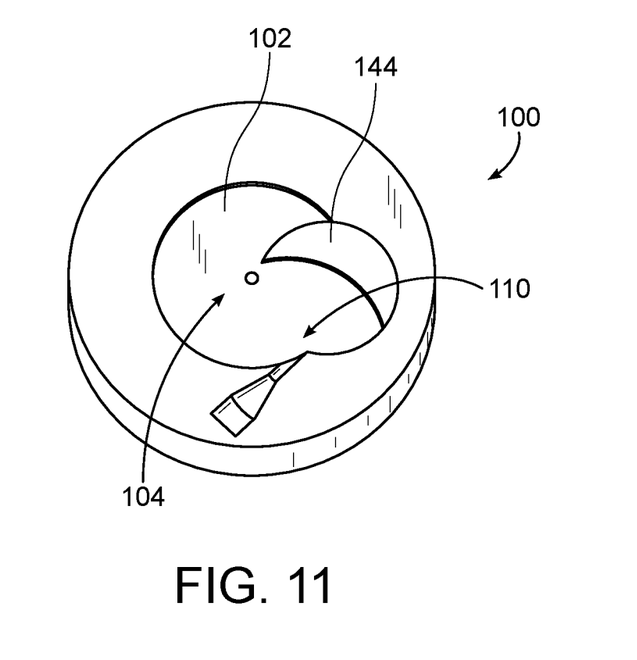

With reference now to FIGS. 10-11, the jet orifice 110 can be fixed relative to the spin chamber 102. The jet member includes a diverter 144 downstream from the jet orifice 110. The diverter 144 is configured to move to divert flow from the jet orifice 110 between the first position shown in FIG. 10 for tangential flow, e.g. where the downstream end of the diverter 144 points tangentially around the drain outlet 104, and the second position shown in FIG. 11 for radial flow, e.g. where the downstream end of the diverter 144 points to more directly to the drain outlet 104.

Systems and methods as disclosed herein provide potential benefits including the following. They do not require match grinding to match a piston and a sleeve. They do not need highly calibrated valve porting (the flow profile can be set electronically). They can be used to trim high power or low power. They do not require large forces to hold position—there is no pressure balance except a relatively small thrust from a jet and force to overcome a spring return if included. They can be designed to fail in place, or closed, or open, depending on spring return chosen. They can adjust 30% or more of flow through adjusting the amount of swirl in the swirl chamber. The amount of adjustable flow depends on the size of the jet and amount of offset of the spin chamber e.g. as shown in FIGS. 8-9. They can be turned completely closed (e.g. with or without a check valve) and can have window opening. They can be integrated with existing hydromechanical valves to incorporate full scheduling.

Figure 12:
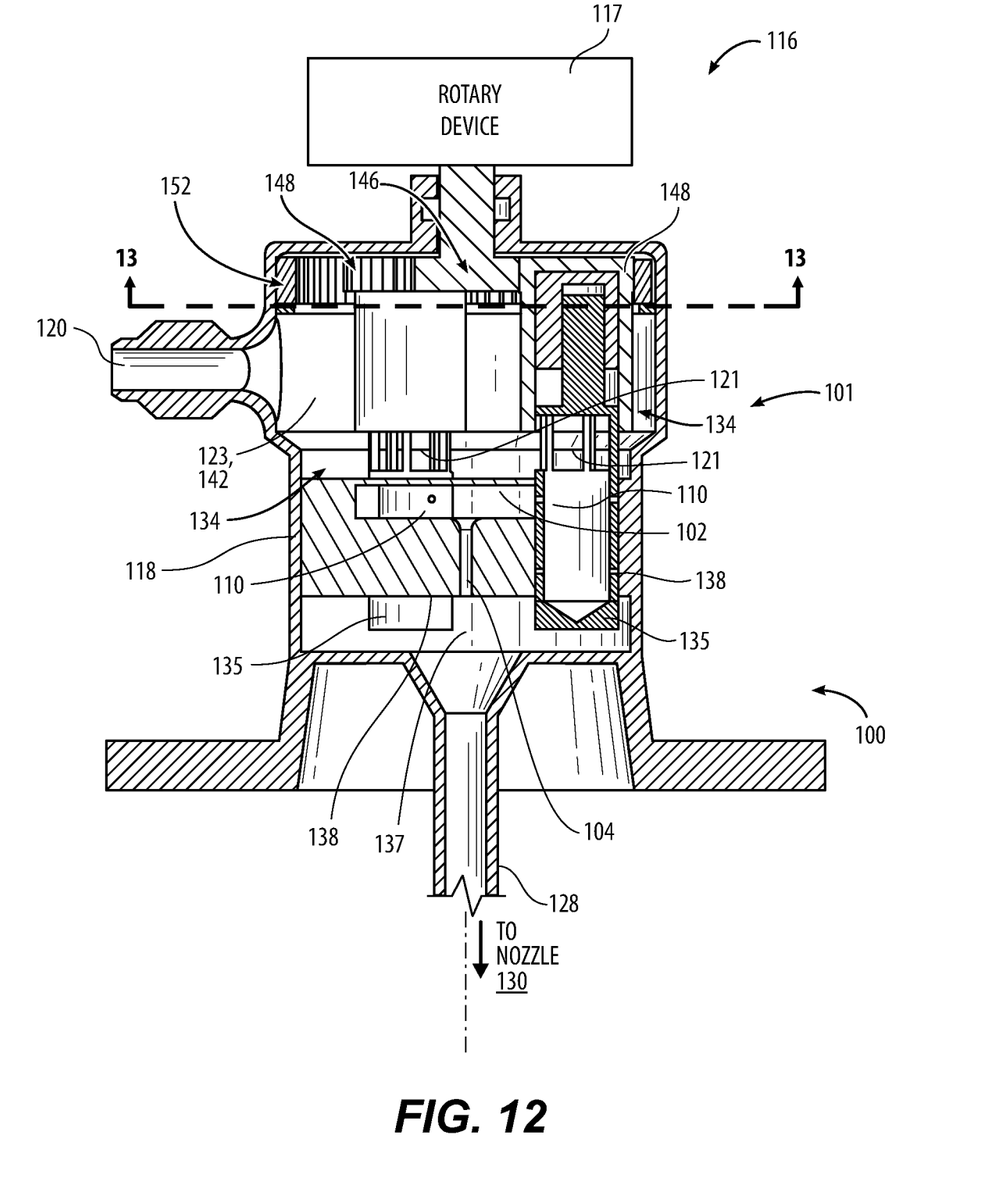
FIGS. 12-13 are schematic cross-sectional side elevation and plan views, respectively, of another embodiment of the system of FIG. 1, showing synchronized jet members.

The foregoing describes valve systems with a single directional jet, however it is also contemplated that a valve system can include multiple direction jets, e.g. as described below with reference to FIG. 12-22. Each directional jet can feed into a single spin chamber, or can feed into its own feed chamber, e.g. multiple spin chambers 102 as in FIG. 9 can each have their own respective directional jet for feeding flow into its own respective outlet drain 104. In FIG. 12, The system 100 includes a single spin chamber 102 with a single outlet drain 104 much as described above. A directional jet system 101 is in fluid communication with the spin chamber 102. The directional jet system 101 includes a plurality of members, i.e. jet members 135 of hydromechanical piston valve assemblies 134, each is configured to move between a first position for directing a tangential flow around the drain 104 of the at least one spin chamber 102 and a second position for directing a radial flow toward the drain 104 of the at least one spin chamber 102.

The housing 118 includes a main inlet 120 in fluid communication with a first chamber 123 in the main flow passage 142. Each of the members 135 includes an inlet 121 in the first chamber 123 and a direction outlet jet 110 in the single spin chamber 102. The main spin surface is planar, but could be made conical, converging towards the drain outlet 104 as described above with reference to FIGS. 2-4. The drain outlet 104 feeds into a third chamber 137 of the hydromechanical piston valve assembly 134 in the housing 118. The third chamber 137, i.e. a hydromechanical piston valve chamber, is in fluid communication with the first chamber 123 through a respective schedule port window 138 defined in each member 135 for scheduled flow based on pressure in the first chamber 123 acting against biasing members, much as described above with reference to FIGS. 8-9 (the restoring springs are not shown in FIG. 12, but see biasing members 140 FIGS. 8-9). The greater the pressure in the first chamber 123, the larger the flow area from ports 138 into the third chamber 137.

Figure 13:
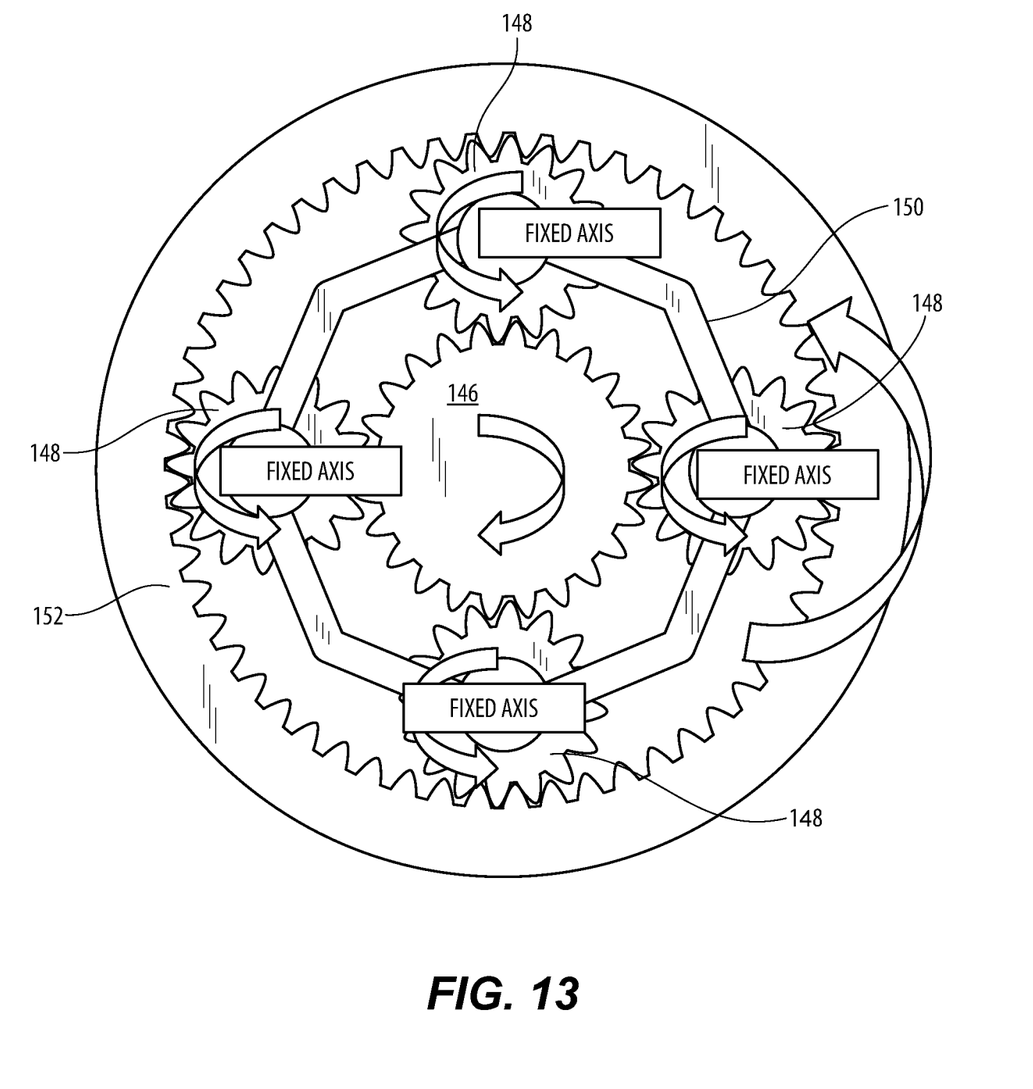

A single actuator 116 is operatively connected to actuate each of the members 135 together. The actuator includes a rotary prime mover 117 outside the housing 118 as depicted in FIG. 12, or inside the housing 118 as depicted in FIG. 9, engaged to rotate a sun gear 146. Each member 135 is engaged to a respective planet gear 148 that meshes with the sun gear 146 for rotation of all of the members 135 between the first and second positions by action of the single rotary prime mover 117. As shown in FIG. 13, a carrier 150 is operatively connected to all of the respective planet gears 148 to maintain a respective fixed rotational axis for each relative to the valve housing 118 for rotation between the first and second positions. The fixed rotational axes are not labeled in FIG. 12, are parallel to the axis A defined by the outlet drain 104 as indicated in FIGS. 9 and 13. The housing 118 itself can be the carrier 150. A ring gear 152 is meshed to all of the respective planet gears 148 and is configured to maintain a respective fixed axis relative to a valve housing 118 for each of the members 148 and provide mechanical advantage. For example, the sun gear 146, planet gears 148, and ring gear 152 can be configured so that 140-degrees of rotation of the sun gear relative to the housing 118 results in 240-degrees of rotation for each of the planet gears 148 relative to the housing 118, and 60-degrees of rotation of the ring gear 152 relative to the housing 118. It is also contemplated that each respective planet gear 148 can have its own unique gear ratio versus the other planet gears 148 with the sun gear 146, e.g. where each of the planet gears 148 has a different number of teeth, so each member 135 of FIG. 12 has a different rate of response relative to one another to motion of the rotary prime mover 117.

Figure 14:
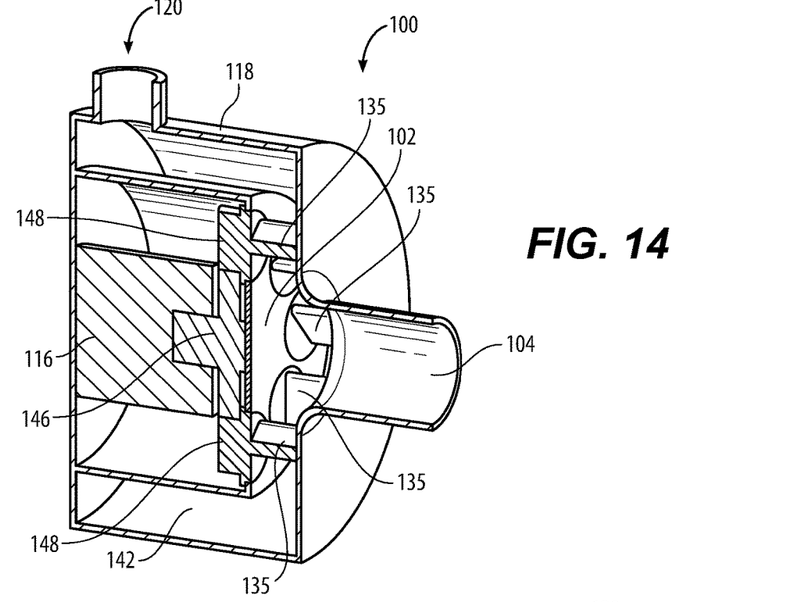
FIGS. 14-15 are schematic cross-sectional and perspective views, respectively, of another embodiment of the system of FIG. 1, showing synchronized vanes
Figure 15:
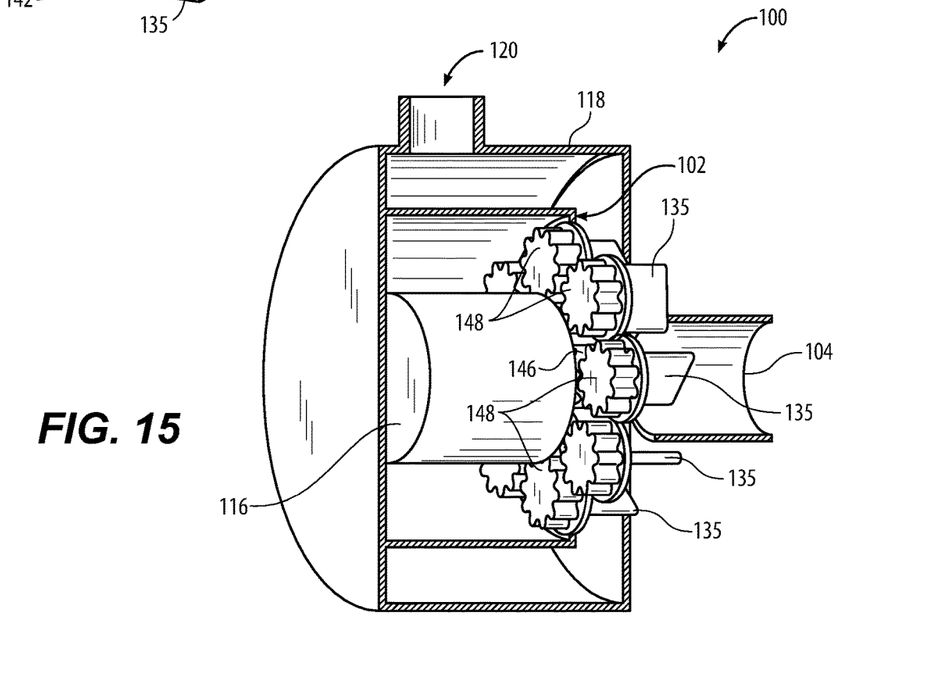
Figure 16:
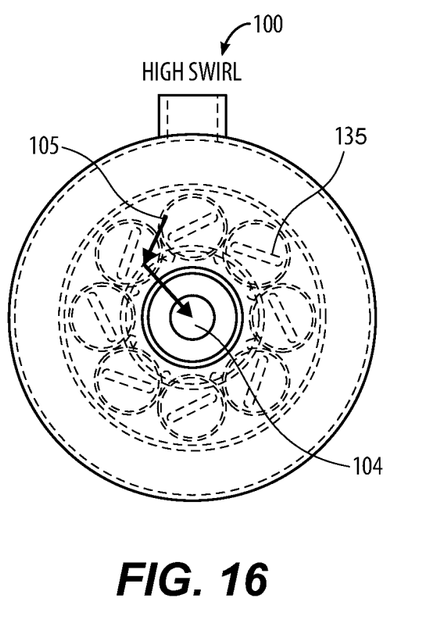
FIGS. 16-18 are schematic end views showing high swirl, medium swirl, and no swirl positions of the synchronized vanes.
Figure 17:
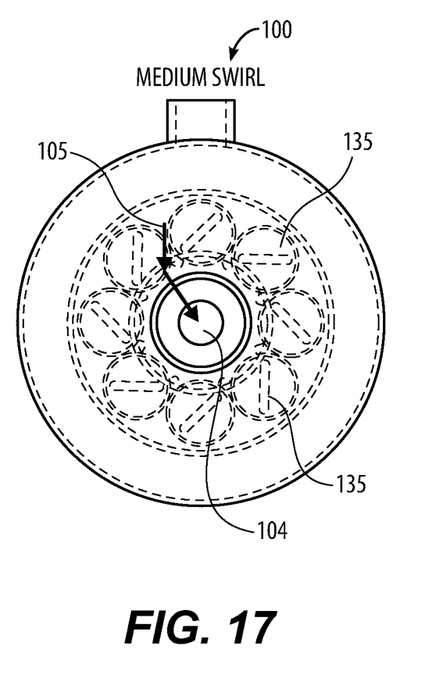
Figure 18:
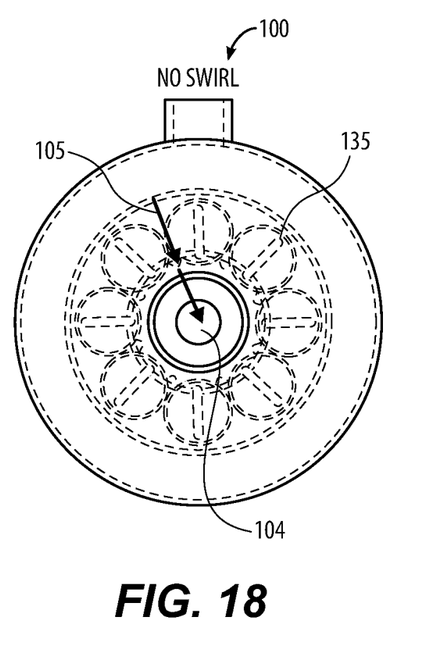

With reference now to FIGS. 14 and 15, the spin chamber 102 is a single spin chamber into which all of the members 135 of the plurality of members are in fluid communication with the single outlet drain 104. A single main inlet 120 feeds into an annular chamber 142 a valve housing 118 that houses the plurality of members 135. Each member 135 is a directional vane, and wherein one flow path 105 (labeled in FIGS. 16-18) is defined from the single inlet 120, through the directional vanes 135, and into the drain 104. Each of the directional vanes 135 is connected to a respective planet gear 148 that is in turn meshed with a single, central sun gear 146 of a rotary actuator 116. As in FIGS. 12-13 above, rotation of the actuator 116 rotates the sun gear 146, which rotates the planet gears 148 around their own fixed axes of rotation. This changes the swirl angle, i.e. the angle of attack of the vanes 135, and results in a different discharge coefficient and raises/lowers flow through the flow path of the system 100. FIGS. 16-18 show positions of the vanes 135 for high swirl (low flow to the drain 104), medium swirl (medium flow the drain 104), and no swirl (high flow to the drain 104), respectively.

Figures 19, 20:
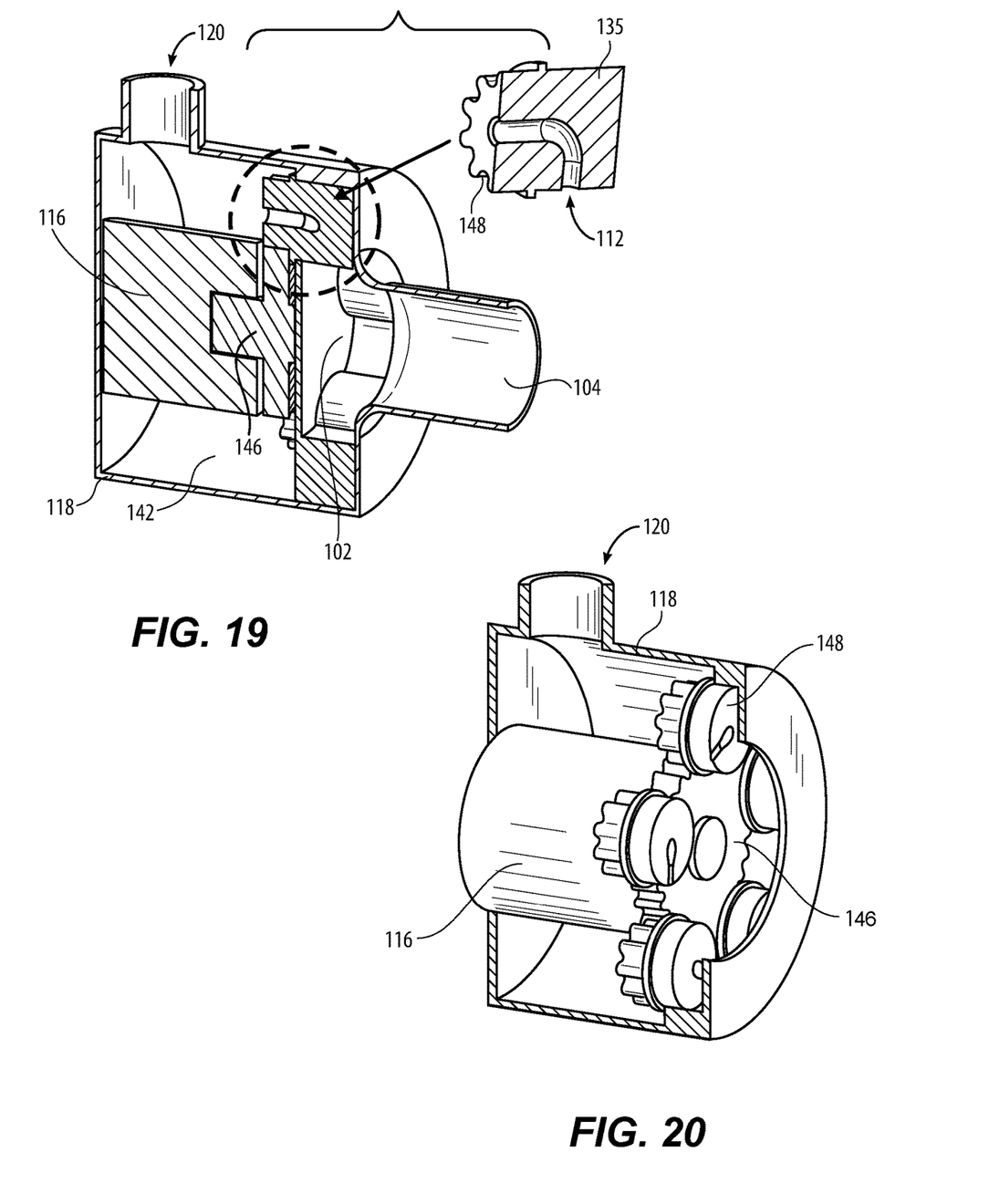
FIGS. 19-20 are schematic exploded cross-sectional perspective and perspective views, respectively, of another embodiment of the system of FIG. 1, showing directional jets with different opening times based on position of the actuator.
Figure 21:
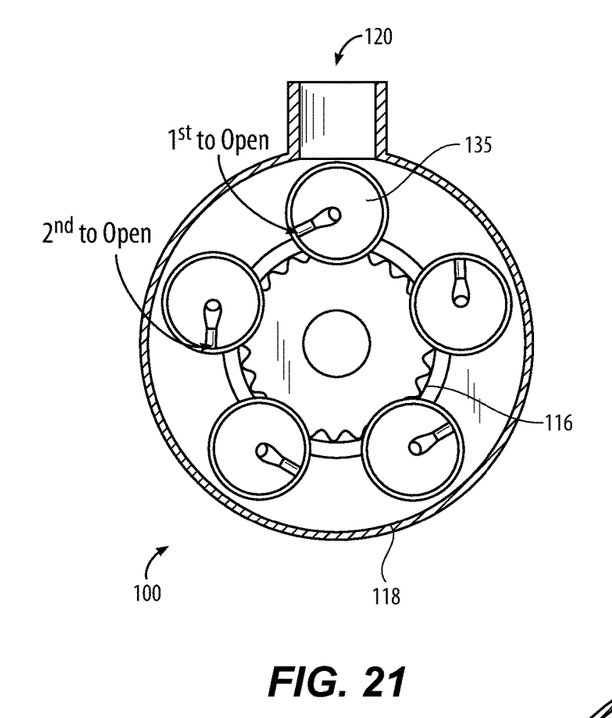
FIGS. 21 and 22 are schematic ends views that show two positions for the directional jets.
Figure 22:
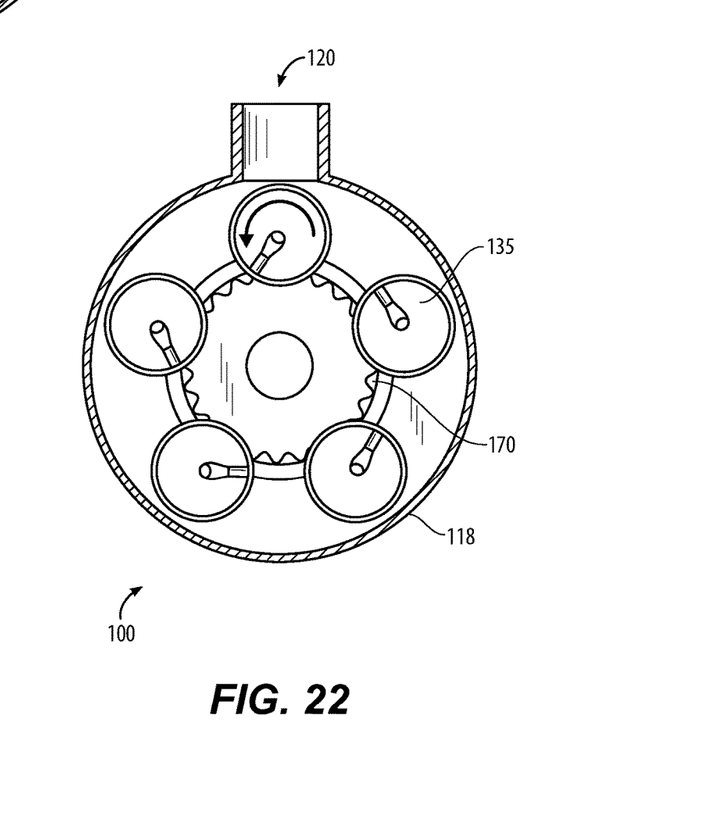

With reference now to FIGS. 19 and 20, the system 100 can be configured similar to FIGS. 14-18 but instead of vanes, each member 135 includes a jet tube 112 defined through a respective rotational body, much as described above with respect to FIGS. 1-4. This allows for a respective seal or check valve 132 (not labeled in FIGS. 19-20 but see FIGS. 5-7) to be operatively connected to the spin chamber 102 for each outlet orifice of the jet tubes 112 in a third position of the directional jet system to stop flow into the spin chamber from the directional jet system below a predetermined pressure, as described above with reference to FIGS. 5-7. It is also contemplated that the plurality of members 135 do not all need to have the same starting positions relative to the actuator 116. As shown in FIGS. 21 and 22, each member 135 in the plurality of members can have a different starting position from the other members 135 relative to the housing 118 and actuator 116 for staggering to allow for a sequenced opening/closing of the jet tubes 112. This can increase the turn down ratio relative to having all of the members 135 open at the same position of the actuator 116.

Arranging more than one swirl valve on a planetary gear system can provide for even greater amplification of swirl effect than having a single swirl member. This can also allow for finer tuning through distributed flow number tailoring.

The methods and systems of the present disclosure, as described above and shown in the drawings, provide for controlling flow through a valve system using a directional jet and spin chamber, wherein changing direction of the jet relative to the spin chamber allows for increasing or decreasing flow through the valve system. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A valve system comprising:
at least one spin chamber having an outlet drain configured to allow flow out of the spin chamber, wherein a main spin surface of the at least one spin chamber is defined around the outlet drain;
a directional jet system in fluid communication with the at least one spin chamber, wherein the directional jet system includes a plurality of members each configured to move between:
a first position for directing a tangential flow around the outlet drain of the at least one spin chamber; and
a second position for directing a radial flow toward the outlet drain of the at least one spin chamber; and
a single actuator operatively connected to actuate each of the members in the plurality of members together, wherein:
the actuator includes a rotary prime mover engaged to rotate a sun gear; and
each member in the plurality of members is engaged to a respective planet gear that meshes with the sun gear for rotation of all of the members of the plurality of members between the first and second positions by action of the rotary prime mover.

2. The system as recited in claim 1, further comprising a carrier operatively connected to all of the respective planet gears to maintain a respective fixed axis relative to a valve housing for each of the members of the plurality of members for rotation between the first and second positions.

3. The system as recited in claim 1, further comprising a ring gear meshed to all of the respective planet gears and configured to maintain a respective fixed axis relative to a valve housing for each of the members of the plurality of members for rotation between the first and second positions.

4. The system as recited in claim 1, wherein each respective planet gear has its own gear ratio to the sun gear unique among the respective planet gears so each member of the plurality of members has a different rate of response relative to one another to motion of the rotary prime mover.

5. The system as recited in claim 1, wherein the rotary prime mover is inside a valve housing.

6. The system as recited in claim 1, wherein the rotary prime mover is operatively connected to rotate the direction jet system between the first position and the second position around a rotation axis parallel to an axis defined by the outlet drain.

7. The system as recited in claim 1, wherein the directional jet system includes a check valve operatively connected to the spin chamber to check the jet orifice in a third position of the directional jet system to stop flow into the spin chamber from the directional jet system below a predetermined pressure.

8. The system as recited in claim 1, wherein the main spin surface is planar.

9. The system as recited in claim 1, wherein the main spin surface is conical, converging towards the drain outlet.

10. The system as recited in claim 1, wherein the at least one spin chamber includes a plurality of spin chambers, each including its own respective drain, wherein each of the members in the plurality of members is in fluid communication with a respective one of the spin chambers in the plurality of spin chambers and is connected in fluid communication to feed into the respective drain.

11. The system as recited in claim 1, wherein the at least one spin chamber is a single spin chamber into which all of the members of the plurality of members is connected in fluid communication to feed into the drain of the single spin chamber.

12. The system as recited in claim 11, wherein a single inlet is connected in fluid communication to feed into a valve housing that houses the plurality of members.

13. The system as recited in claim 12, wherein each member of the plurality of members is a directional vane, and wherein one flow path is defined from the single inlet, through the directional vanes, and into the drain.

14. The system as recited in claim 12, wherein each member in the plurality of members includes a jet tube defined through a respective rotational body.

15. The system as recited in claim 12, wherein each member in the plurality of members has a different starting position from the other members in the plurality of members relative to the housing.

16. The system as recited in claim 1,
wherein the housing includes a main inlet in fluid communications with a first chamber,
wherein the at least one spin chamber is a single spin chamber in the housing,
wherein each of the members in the plurality of members includes an inlet in the first chamber and a direction outlet jet in the single spin chamber,
wherein the housing includes a third chamber in fluid communication with the first chamber through a respective schedule port window defined in each member of the plurality of members.

17. The system as recited in claim 16, wherein the rotatory prime mover actuator is outside of the housing with a shaft extending into housing operatively connected to rotate the directional jet system.

18. The system as recited in claim 1, further comprising:
a feed arm connected in fluid communication with the drain outlet; and
a spray nozzle connected in fluid communication with the feed arm downstream of the drain outlet for issuing a spray.

19. A valve system comprising:
at least one spin chamber having an outlet drain configured to allow flow out of the spin chamber, wherein a main spin surface of the at least one spin chamber is defined around the outlet drain;
a directional jet system in fluid communication with the at least one spin chamber, wherein the directional jet system includes a plurality of members each configured to move between:
a first position for directing a tangential flow around the outlet drain of the at least one spin chamber; and
a second position for directing a radial flow toward the outlet drain of the at least one spin chamber;
wherein the at least one spin chamber includes a plurality of spin chambers, each including its own respective drain, wherein each of the members in the plurality of members is in fluid communication with a respective one of the spin chambers in the plurality of spin chambers and is connected in fluid communication to feed into the respective drain.

20. The system of claim 19, wherein the main spin surface is planar, or wherein the main spin surface is conical, converging towards the drain outlet.

* * * * *